United States Patent [19]

Kerrey

[11] Patent Number: 4,663,119
[45] Date of Patent: May 5, 1987

[54] METHOD AND APPARATUS FOR SECURING STRUCTURAL TUBES IN NUCLEAR REACTOR FUEL ASSEMBLIES

[75] Inventor: John S. Kerrey, Columbia, S.C.

[73] Assignee: Westinghouse Electric Corp., Pittsburgh, Pa.

[21] Appl. No.: 790,677

[22] Filed: Oct. 23, 1985

Related U.S. Application Data

[62] Division of Ser. No. 637,374, Aug. 3, 1984.

[51] Int. Cl.<sup>4</sup> ................................................ G21C 3/32
[52] U.S. Cl. .................................... 376/446; 376/442; 29/523; 29/723; 29/400 N; 72/393
[58] Field of Search ....................... 376/442, 446, 449; 29/400 N, 523, 723; 72/393

[56] References Cited

U.S. PATENT DOCUMENTS 4,229,259  10/1980  Vaill ..................................... 376/442

Primary Examiner—Donald P. Walsh

[57] ABSTRACT

An insert for providing a reduced inside diameter for a structural tube, specifically an instrumentation guide tube, of a nuclear fuel assembly. The insert has forming lobes which coact with the structural tube to plastically deform the structural tube and mechanically lock it with respect to grid straps of a grid assembly. The insert also has centering lobes to prevent it from being expanded in other than a coaxial alignment with the structural tube. An expansion tool is provided for sequentially registering with and expanding sequential forming lobes in a simplified manner whereby all of the operations necessary to assemble the structural tube in the fuel assembly can be easily and accurately performed.

4 Claims, 6 Drawing Figures

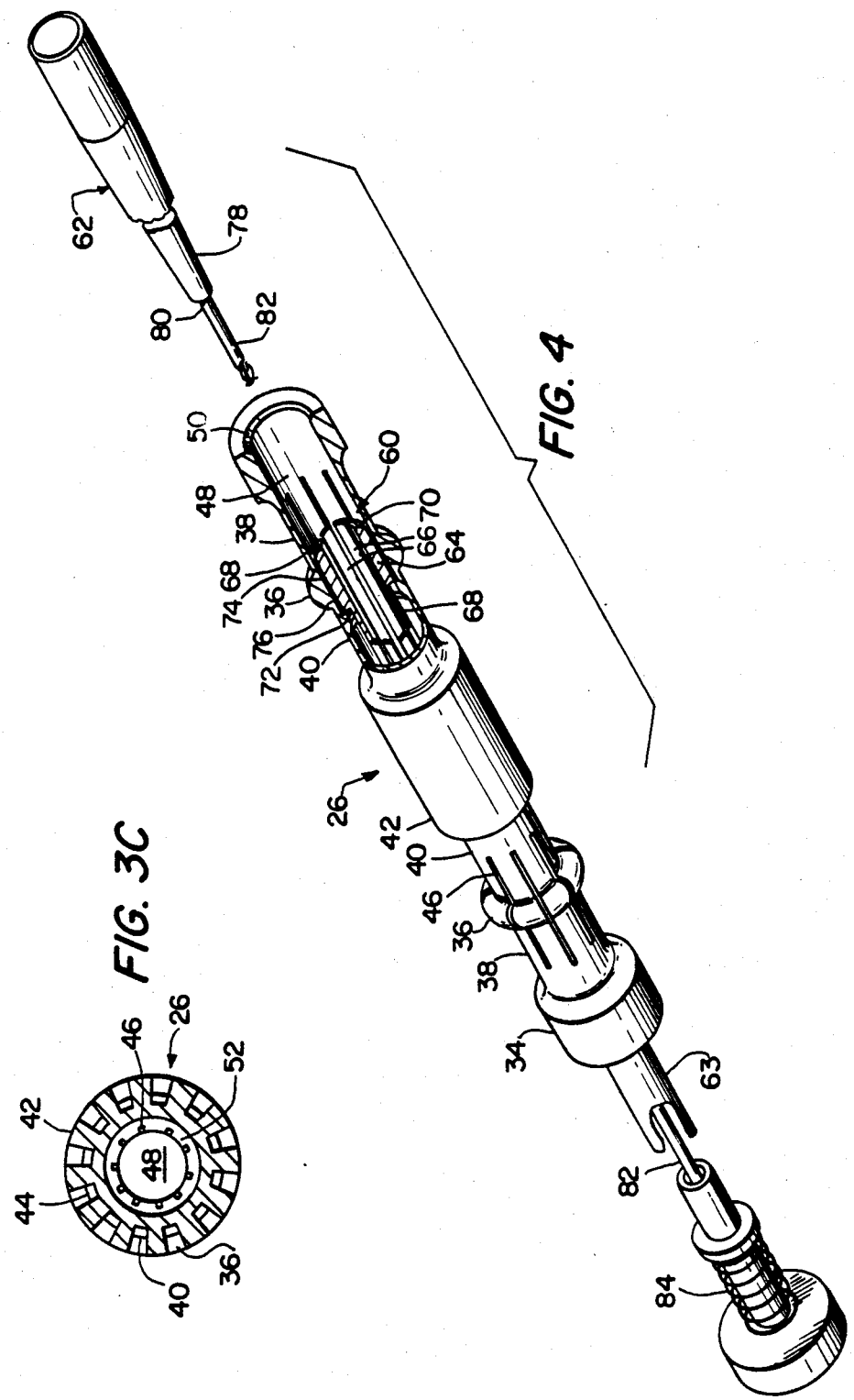

METHOD AND APPARATUS FOR SECURING STRUCTURAL TUBES IN NUCLEAR REACTOR FUEL ASSEMBLIES

This is a division of application Ser. No. 06/637,374, filed Aug. 3, 1984.

FIELD OF THE INVENTION

The present invention relates to nuclear reactor fuel assemblies, and more particularly to a method, apparatus and tool for providing a concentric, reduced inside diameter or otherwise restricting large diameters of structural tubes used in the fabrication of nuclear fuel assemblies.

BACKGROUND OF THE INVENTION

A typical nuclear reactor fuel assembly includes top and bottom support members having a multiplicity of fuel rods and control rod guide tubes supported therebetween. Each fuel rod and control rod guide tube is separately held against lateral displacement by grids, generally of an egg crate configuration, which are axially spaced along the fuel assembly length. Since the fuel rods and control guide tubes are usually made of Zircoloy and the grid assemblies used for supporting these components are usually made of Inconel, the incompatibility of the materials requires that the grids be held in position along the fuel assembly length by mechanical means, rather than brazing, welding or the like.

In one well-known grid design short sleeves, which correspond to the number of control rod guide tubes in the fuel assembly, are brazed at appropriate points in grid assembly cells which are formed by interleaved grid straps. Each sleeve projects on the order of about two inches beyond the edge of a grid strap. During assemly of the fuel assembly, the grids are mounted in an axial predetermined position and after the control rod guide tubes are pulled through the grid sleeves, a bulging tool is moved into the control rod guide tube and stopped at a point just below a grid strap, but still inside the sleeve which extends through the grid cell. The tool is then expanded to cause projections on the tool to plastically deform the control rod guide tube and sleeve. The bulging tool is then moved to a point just above the grid, and the process of plastically deforming the material again repeated with the result being that the grid is mechanically locked and rigidly secured to the control rod guide tubes in the fuel assembly.

Prior art bulge tools, such as that described in U.S. Pat. No. 4,229,259 comprise a cylindrical housing having axially extending tines formed by slots cut into the walls of the cylindrical housing. Projections are integrally formed in the outer surface of the tines near the end of the cylindrical housing. These projections are made to move radially outward under the influence of an internally operating ram to form bulges in a sleeve and guide tube while plastically deforming the material thereof. As the sleeve and guide tube material is deformed by the action of the ram riding on the complementary inner surfaces of the tines, the inner diameter of the tubes is held to a predetermined minimum by a coacting effect of other tines, located between the tines having projections, and the ram surfaces.

In the above-described prior art fuel assemblies, the sleeve and guide tubes are deformed with dimple-like bulges circumfunctially spaced about 90° apart to capture the guide tube with respect to the grid straps. The guide tubes are therefore subject to local stresses at the bulges. In addition, the prior art expansion tools require several operations to create all of the necessary bulges to securely capture the guide tube at the various axially spaced grid locations in the fuel assembly.

SUMMARY OF THE INVENTION

It is therefore an object of the present invention to provide a device for centering an insert within a relatively large diameter structural tube.

It is a further object of the present invention to provide a device for centering and capturing an insert within a relatively large diameter structural tube in a nuclear fuel assembly.

It is a further object of the present invention to provide an effective reduced diameter inside of a relatively large diameter structural tube in a nuclear fuel assembly.

It is a still further object of the present invention to provide a method and apparatus for automatically feeding and locating inserts for producing a reduced, concentric inside diameter in large diameter structural tubes.

In accordance with a preferred embodiment of the invention, these and other objects are accomplished by providing a nuclear fuel assembly having a skeletal structure comprising a bottom nozzle assembly, a top nozzle assembly, at least one control rod guide tube extending between said top and bottom nozzle assemblies and at least one grid assembly, disposed in said fuel assembly between said top and bottom nozzle assemblies, the guide tube extending through and being captured with respect to said grid assembly. An instrumentation structural tube is provided which extends at least partially between the top and the bottom nozzle assemblies and through the grid assembly. A restricted inside diameter insert is coaxially disposed within the instrumentation structural tube at a location where the structural tube passes through the grid assembly. The restricted inside diameter insert is operable to provide a central opening having an engineered inside diameter and is further operable to lock the structural tube into the fuel assembly at the grid assembly location.

In accordance with another embodiment of the invention, there is provided an insert for providing a reduced inside diameter for a structural tube having a nominal inside diameter. The insert is provided with one or more lobes for centering the insert within the structural tube inside diameter, and forming lobes, which are operable to expand and locally deform the structural tube inside diameter. Projections are provided on the reduced inside diameter of the insert which are operable to cooperate with an expansion tool to accurately position the expansion tool with respect to the forming lobes.

In accordance with a further aspect of the present invention, there is provided an expansion tool which comprises a hollow, generally cylindrical housing. A plurality of tines are formed on an end portion of the housing. The end portion includes a head portion which has a forming surface for contacting an insert which is to be expanded. The tool has a shoulder which registers with a projection on the insert to accurately position the forming surface within the insert. A movable expander pin having a tapered section is adapted to be inserted into the cylindrical housing. The expander pin cooperates with the tines to radially expand the tines whereby the forming surface contacts and plastically deforms the insert.

Finally, in accordance with another aspect of the present invention there is provided a method of securing structural tubes in grid assemblies having grid straps in a nuclear reactor fuel assembly. The method comprises the steps of loading a plurality of inserts having first and second projections on inside diameters thereof onto an expansion tool. The expansion tool is then inserted into the structural tube and a first of the inserts is aligned with a first grid assembly whereby first and second forming lobes, which are associated with the first and second projections respectively, straddle the grid straps. An expander pin is then inserted into the expansion tool to plastically deform the first expansion lobe against the structural tube to thereby plastically deform and mechanically lock together the insert and structural tube on one side of the grid strap. The expander pin is then withdrawn a distance sufficient to relax the expansion tool and the expansion tool is withdrawn within the structural tube until a shoulder thereof registers with the second projection of the first insert. The expander pin is then reinserted into the expansion tool to plastically deform the second expansion lobe against the structural tube thereby mechanically locking the insert and structural tube together on the other side of the grid strap. The expansion pin is then withdrawn a distance sufficient to relax the expansion tool and the expansion tool is withdrawn until the shoulder thereof registers with the first shoulder of a second insert. The second insert is then aligned with the second grid assembly and the steps are repeated until all the inserts have been expanded at the appropriate grid locations.

BRIEF DESCRIPTION OF THE DRAWINGS

The accompanying drawings, which are incorporated in and form a part of the specification illustrate a presently preferred form of the present invention, and together with the description, serve to explain the principles of the invention.

In the drawings:

FIG. 3C is a sectional view along sectional lines C—C of FIG. 3A;

FIG. 4 illustrates a perspective, exploded view, in partial cutaway of a centering and internal restrictor device showing an expansion tool and expander pin according to the present invention.

DETAILED DESCRIPTION OF A PREFERRED EMBODIMENT

A typical fuel assembly used in nuclear reactors consists of multiple fuel rods held in parallel spaced relation with each other by top and bottom support members and by grids, which may typically be of the so-called of the "egg-crate" configuration and which are axially spaced along the fuel rod length. Certain cells of each grid may contain a short, thin-walled, sleeve brazed or otherwise affixed to the grid straps. Control rod guide tubes, each of which accommodates movement of control rods therethrough and instrumentation structural tube, extend through the sleeves. As used herein an instrumentation structural tube is a relatively large inside diameter tube which extends axially through fuel assembly for accommodating diagnostic equipment. Such structural tubes are typically of a similar size to a control rod guide tube so as to snugly fit inside the grid cells and are made of similar material, typically Zircoloy. In accordance with present practice, when the material of the grid and control rod guide tubes or structural tubes are different, e.g. Inconel and Zircoloy respectively, the grid sleeve, and therefore the grid, is mechanically attached to the control rod guide tubes or the instrumentation structural tubes by a bulging technique which includes plastically deforming each control rod guide tube or structural tube and sleeve on opposite sides of the grid. This action effectively locks the grid on the control rod guide tubes or instrumentation structural tube and precludes its displacement when the grid is subjected to hydraulic forces, for example during reactor operations.

Figure 1:
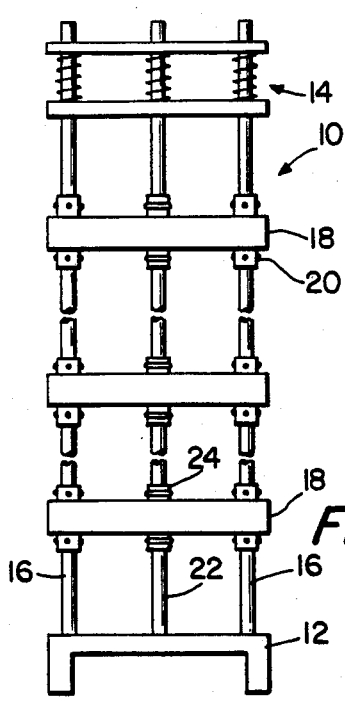
FIG. 1 illustrates, in schematic form, a plan fragmentary view of a skeleton of a typical nuclear fuel assembly (without fuel rods) showing an instrumentation tube and guide tube.

Referring now to the drawings wherein like reference characters designate like or corresponding parts throughout the several views, there is shown in FIG. 1 a skeleton of a typical fuel assembly 10. The skeleton comprises a conventional bottom nozzle 12 and a conventional top nozzle 14 with a plurality of structural members, such as control rod guide tubes 16, extending therebetween. Axially spaced along the fuel assembly 10 are a series of conventional support grids 18 for supporting fuel rods (not illustrated) in a spaced-apart lateral array. The support grids 18 may be of the egg-crate configuration having opposing springs and hard stops for laterally fuel rods while permitting relative axial movement between fuel rods. The fuel rod support mechanism of the grids 18 forms no part of the present invention.

As alluded to above, several cells of each grid 18 may have a short, thin-walled sleeves 20 brazed or otherwise fixed to the straps which form the grid cells. The guide tubes 16 extend through the sleeves 20 and are typically captured in the sleeves by a bulging technique such as described in U.S. Pat. No. 4,229,259.

Other tubular members, such as an instrumentation tube 22, also extend through the fuel assembly 10 between the bottom nozzle 12 and top nozzle 14. As alluded to above, the instrumentation tube carries diagnostic sensors for monitoring the operation of the fuel assembly. The instrumentation tube 22 is generally of similar size and made of similar material as the guide tube 16. While a relatively large inside diameter tube is needed for accommodating control rod passage, a significantly smaller inside diameter tube is needed for accommodating the instrumentation tube.

Figure 2:
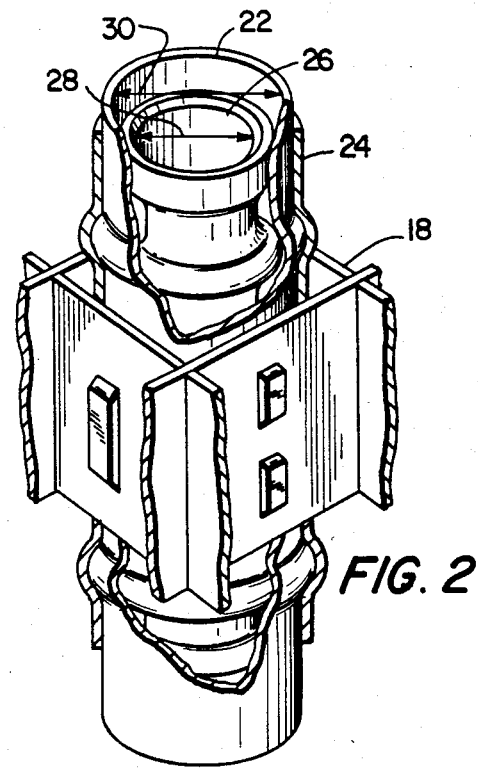
FIG. 2 illustrates a perspective, cutaway view, in partial section of an instrumentation structural tube passing through a grid cell showing a preferred positioning of the centering and inside diameter restricting device according to the present invention.

In order to support the instrumentation structural tube 22 in the grid 18, a sleeve 24 may be welded or fixed to the grid in a manner similar to the guide tube sleeves 20. However, as best seen in FIG. 2, in order to effectively reduce the internal diameter of the instrumentation tube, a reduced diameter insert 26 is positioned in the instrumentation tube 22 where the instrumentation tube 22 passes through the grid 18. The internal diameter 28 of the insert may typically be on the order of about 1.2 to 1.8 centimeters while the inside diameter 30 of the instrumentation tube may typically be on the order of 2.0 to 2.5 centimeters.

The reduced diameter insert 26 according to the present invention is designed to cooperate with the instrumentation structural tube 22, the sleeve 24 and grid 18 to properly accommodate the fuel assembly instrumentation and also to cooperate with an expansion tool (described below) to secure the instrumentation structural tube at each grid location in an efficient and simple manner using a minimum number of formation operations to lock the insert, structural tube, and sleeve together and to fix the position of the tube with respect to the grid.

Figure 3A:
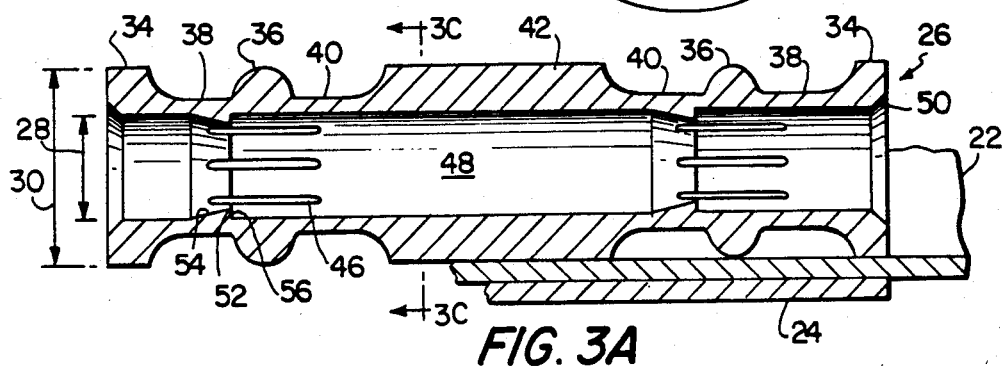
FIG. 3A is a sectional view of a centering and internal diameter restricting device prior to expansion within a structural tube.

Turning now to FIG. 3A, there is illustrated a sectional view of a typical insert 26. The outside diameter of the insert has a diameter 32 which affords a slip fit inside the inside diameter 30 of the instrumentation structural tube 22. Preferably, each insert has at its ends, centering lobes 34 which have an outside diameter which prevents the inserts from being fitted or moved within the structural tube 22 in a skewed fashion, in other words to maintain the insert 26 coaxial with the structural tube 22. As hereinafter described in detail, each insert is also provided with forming lobes 36 which are used to contact and plastically deform the structural tube 22 and sleeve 24.

On the outboard and inboard sides of the forming lobes 36, are reduced diameter portions 38 and 40 respectively which facilitate deformation of the forming lobes 36. As will be understood by the artisan, the two inboard reduced diameter portions 40 may advantageously extend completely between the forming lobes 36 of the insert 26 in order to eliminate as much neutron-absorbing material as possible from the core. Alternatively, a central lobe 42 can be provided between the inboard reduced diameters 40. The lobe 42 can function as a centering lobe in lieu of the centering lobes 34 or, where lobes 34 are used, in addition to the centering lobes 34. In order to provide for coolant flow and to eliminate additional nonessential material, the central lobe 42 and the centering lobes 34 may be provided with longitudinal slots 44 circumferentially spaced around the insert as best illustrated in FIG. 3C.

Since, as explained below, the forming lobes 36 are plastically deformed after insertion in the structural tube, it is advantageous to provide means, in addition to the reduced diameter portions 38 and 40, for allowing the material surrounding the lobes 36 to deform. Such means may comprise a series of circumferentially spaced, elongated expansion slots 46.

Each insert 26 has as internal bore 48 which is advantageously provided with a bevel 50 to facilitate insertion of an expansion tool (described below) during fabrication and subsequently the insertion of instrumentation into the insert 26.

In order to permit the insertion tool to pass through the insert 26 and to automatically provide registration between the expansion tool and the forming lobes 36, a circumferential projection 52 is formed on the bore 48 adjacent to each of the forming lobes 36.

In order to allow the expansion tool to pass through the bore 48, each of the projections has a sloped side 54. In order to prevent the expansion tool from being withdrawn prior to the deformation of the forming lobe 36, an opposite side of each projection 52 is provided with a shoulder 56 which cooperates with a shoulder, described below, on the expansion tool to automatically register a forming surface of the expansion tool with the forming lobe 36.

Figure 3B:
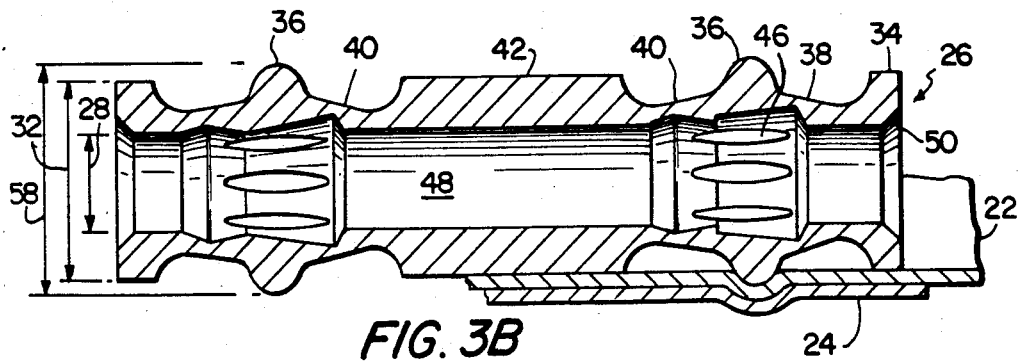
FIG. 3B is a sectional view of the centering and internal restrictor device of view 3A after expansion thereof.

FIG. 3B illustrates the insert 26 after expansion. A portion of the instrumentation structural tube 22 and sleeve 24 has been plastically deformed by the forming lobe 36. The forming lobes 36 are expanded to an outside diameter 58 which is greater than the underformed inside diameter 30 of the instrumentation structural tube 26. In order to accommodate this expansion, the expansion slots 46 have widened and the reduced diameter portions 38 and 40 have plastically deformed. In addition, the projections 52 are expanded so as not to interfere with the inside diameter 28 of the bore 48 to thereby allow withdrawal of the expansion tool. It should be understood that the nature and extent of the deformation illustrated in FIG. 3B is exaggerated for clarity.

Turning now to FIG. 4, there is depicted an exploded view of the insert 26 being carried on the end of an expansion tool 60. An expander pin 62, which cooperates with the expansion tool 60 to deform the forming lobe 36 into the structural tube 22, is also illustrated. The structural tube and sleeve are omitted from FIG. 4 for clarity.

The expansion tool 60 has a means for supporting a plurality of inserts in their unexpanded condition. Such a means may comprise a long shank portion 63. Advantageously, the shank portion 63 is long enough to support as many inserts as will be used to secure the structural tube 22 in the fuel assembly 10, i.e. one for each grid location.

The expansion tool 60 has a head portion 64 which is operable to be expanded by the pin 62 to plastically deform the insert 22.

The head portion 64 of the tool 60 is hollow and comprises a series, preferably eight, of forming tines 66 which are moved radially outward when the expander pin 62 is inserted therein. Slots 68 between adjacent tines 66 extend along the head portion for a sufficient length to impart the necessary flexibility to the tines. For example, the head portion 64 of the tool along which the slots 68 extend will preferably be on the order of 5-15 centimeters with the slots 68 having a width of about 2 millimeters. The wall thickness of a tine may be on the order of about 6 millimeters thereby providing tines which can be easily moved radially inwards and outwards and still not be so rigid as to work harden the material as a result of continual flexing.

The head portion 64 of the expansion tool is advantageously provided with a leading bevel 70 which not only facilitates entry of the expansion tool 60 through the inserts 62, but also helps to deform the tines radially inwardly by a camming action as the head portion passes the sloped surface 54 of the projection 52. Shoulders 72 on the head portion 64 cooperate with the shoulders 56 on the projections 52 to prevent the tool 60 from being withdrawn prior to an expansion operation.

The head portion 64 of the expansion tool is preferably provided with a raised forming surface 74 which, when the pin 62 is inserted, expands through a narrow gap 76 to contact the inner diameter of the bore 48 in the vicinity of the forming lobe 36. While the forming surface 76 as illustrated in FIG. 4 is a flat, cylindrical surface, it should be understood that it may also be formed as an arcuate surface or the like depending upon the geometry of the insert.

The expansion pin 62 has a taper portion 78, the head 80 of which is advantageously in the form of a sphere to facilitate insertion and alignment with the head portion 64 of the expansion tool. The maximum diameter of the insert is sized to clear the inside diameter 28 of the insert for easy removal of the pin after all of the inserts have been expanded and locked into place.

Advantageously, the pin 62 may have a pull rod 82 which extends through the center of the tool 60 and which may be used to deform the forming lobes 36 of the insert 26 as described below.

In operation, the expansion tool 60 is first "loaded" with a plurality of inserts 26 by inserting it through the inserts in a direction to force the tines 66 radially inward with respect to the projections 52. The inserts may be held in an end-to-end stacked relationship on the shank portion 63 of the tool by a loading spring assembly 84.

The expansion tool 60 with the unexpanded inserts 26 is then inserted into the instrumentation structural tube 22 in a fuel assembly 10. At each location where a sleeve 24 is brazed or otherwise fastened to a grid 18, the insert 26 is aligned with the sleeve 24 as illustrated in FIG. 2 so that the expansion lobes 36 are disposed on opposite sides of a grid strap. In other words, the expansion lobes 36 straddle the grid strap, but are within the sleeve 24.

The expansion pin 62 is then inserted via a pull rod 82, or a similar device, into the expansion tool, forcing the tines 66 radially outward and physically deforming the expansion lobes 36 against the tube 22 and sleeve 24. The pin 62 is then removed a distance sufficient for the tines 66 to reassume their normal, relaxed position and the expansion tool 60 is further withdrawn until the shoulder 72 of the head portion abuts the shoulder 56 of the next projection 52. The expansion operation is then repeated in order to expand the second expansion lobe 36 of the insert 26. This effectively locks the structural tube on either side of the grid strap.

The expansion pin 62 is then again removed a distance sufficient to allow the tines to relax, and the tool 60 is withdrawn until the tool shoulder 72 abuts the first shoulder 56 of the next insert 26. By further withdrawal of the tool 60, the next insert 26 is aligned with the next sleeve 24 and expansion operations described above repeated until all of the inserts have been installed. The expansion tool 60 and expansion tool 62 are then removed.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, the expansion pin can operate either as a push or a pull pin depending on the side of the expansion lobe from which it is inserted. The centering lobes 34 can be omitted as long as the central lobe 42 is of sufficient axial length to prevent the insert 26 from becoming skewed in the structural tube 22. While the expansion slots 46 facilitate plastic deformation of the material in the vicinity of the expansion lobes 36, they can be omitted if the material is sufficiently thin or ductile. In addition, the projections 52 can be formed in any configuration which will permit the expansion tool to pass when being inserted, but which will prevent the expansion tool from being withdrawn until the lobes 36 of the insert have been expanded. In addition, with some grid assembly configurations the sleeves 24 can be omitted and the structural tube 22 directly expanded above and below a grid strap location or into the grid strap.

The embodiment described above was chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method of securing structural tubes in a nuclear fuel assembly by locking said structural tubes to a plurality of grid assemblies having grid straps, said method comprising the steps of:
   (a) loading a plurality of inserts, each of said inserts having first and second projections on an inside diameter thereof and corresponding first and second forming lobes on an outside diameter thereof, onto an expansion tool;
   (b) inserting said expansion tool into said structural tube;
   (c) aligning a first of said inserts with a first of said grid assemblies whereby the first and second forming lobes of the first insert straddle a grid strap of the first grid assembly;
   (d) inserting an expander pin into said expansion tool to radially expand said tool to plastically deform said first forming lobe radially against said structural tube thereby plastically deforming and mechanically locking together said first insert and said structural tube;
   (e) withdrawing said expansion pin a distance sufficient to relax said expansion tool;
   (f) withdrawing said expansion tool until a shoulder thereof registers with said second projection of the first insert;
   (g) inserting said expander pin into said expansion tool to plastically deform said second forming lobe of the first insert against said structural tube, thereby plastically deforming and mechanically locking together said first insert and said structural tube;
   (h) withdrawing said expansion pin a distance sufficient to relax said expansion tool;
   (i) withdrawing said expansion tool until said shoulder thereof registers with the first shoulder of an adjacent insert;
   (j) aligning said adjacent insert with an adjacent grid assembly and repeating step d) to i) until the forming lobes of all of said inserts have been expanded.

2. The method of claim 1 further comprising providing an insert for each of said plurality of grid assemblies.

3. The method of claim 1, wherein said structural tubes pass through a cell of each of said plurality of grid assemblies, each of said cells having a sleeve attached thereto, wherein the step of aligning comprises aligning each of inserts with a respective sleeve; and the step of inserting further comprises inserting the expander pin into the expansion tool to plastically deform the forming lobes of said insert against the structural tube and the respective sleeve to plastically deform and mechanically lock together the insert, structural tube and sleeve.

4. A method of securing a structural tube in an elongated skeletal assembly having a plurality of axially spaced restraining assemblies through which said structural tube passes, said method comprising the steps of:

(a) providing a plurality of inserts equal in number to said plurality of restraining assemblies;
(b) inserting said inserts into said structural tube;
(c) aligning a first of said inserts with a first of said restraining assemblies;
(d) fixing said insert with respect to said restraining assembly by plastically deforming said insert against said structural tube;
(e) aligning an adjacent insert with an adjacent restraining assembly; and
(f) repeating steps d) and e) until each of said inserts has been plastically deformed against said structural tube at each of said restraining assemblies.

* * * * *